United States Patent [19]

McWhorter et al.

[11] Patent Number: 4,500,110

[45] Date of Patent: Feb. 19, 1985

[54] ECCENTRIC ADJUSTMENT FOR VEHICLE AXLE SUSPENSIONS

[76] Inventors: Fred A. McWhorter, 2134 Kraftmeyer Dr., Davenport, Iowa 52803; William L. Bates, 1731 - 18th St., Bettendorf, Iowa 52722

[21] Appl. No.: 484,725

[22] Filed: Apr. 13, 1983

[51] Int. Cl.³ .............................................. B60G 11/10
[52] U.S. Cl. .................................... 280/680; 280/677; 267/36 A
[58] Field of Search ............... 280/677, 680, 104, 686, 280/687; 267/36 A

[56] References Cited

U.S. PATENT DOCUMENTS

| Re. 24,374 | 10/1957 | Martin | 280/680 |
|---|---|---|---|
| 1,784,268 | 12/1930 | Buckendale et al. | 280/680 |
| 2,137,699 | 11/1938 | Price | 280/680 |
| 3,142,493 | 7/1964 | Hartzell et al. | 280/680 |
| 3,367,677 | 2/1968 | Preddy | 280/680 |
| 3,907,324 | 9/1975 | Mastin | 280/680 |

*Primary Examiner*—Richard A. Bertsch

[57] ABSTRACT

The background disclosure is of a somewhat typical tandem-axle vehicle suspension, especially for motor trucks, made up of a pair of spring-supported, fore-and-aft walking beams and a pair of transverse rear axles. The improvement resides in structure interconnecting the axle housing and walking beams to provide for fore-and-aft adjustment of the axle housing relative to each other and to the walking beams so as to assure or at least approach parallelism of the axle housing with respect to each other and perpendicularity thereof to the vehicle fore-and-aft centerline. Each end of each walking beam is connected to its associated axle housing portion by a pair of relatively angularly cooperative members of circular configuration but having eccentric axes so that when one member is turned relative to the other, the fore-and-aft relationship of the adjusted axle housing changes. The improved interconnecting structure ties in closely with existing parts, at least in some known designs of typical suspensions, mainly using rubber bushings in the interconnections so that each end of an axle housing may be adjusted relative to the other without imposing undue stresses.

8 Claims, 7 Drawing Figures

ECCENTRIC ADJUSTMENT FOR VEHICLE AXLE SUSPENSIONS

BACKGROUND OF THE INVENTION

A typical tandem-axle motor vehicle rear suspension will include right and left walking beams pivotally carried intermediate their front and rear ends on the vehicle frame, usually by means of leaf springs or the like. A pair of transverse axle housings is arranged to span the walking beams adjacent to their front and rear ends. Conventional connecting structure between the axle housings and walking beams includes, at each end of an axle housing, a pair of ears welded to the housing and spaced apart laterally so as to straddle the associated end of the walking beam. These ears are provided with circular openings coaxial with a transverse bore through the end of the walking beam and appropriate bushings and tie means are utilized to pivotally interconnect the housings and beams for relative movement about several transverse axes.

The basic problem encountered in systems of this type arises from the fact that the axle housing ears are seldom accurately positioned relative to the housing before welding and, if they are, the heat generated by the welding operation quite often distorts the relationship, with the end result that the suspension, when ultimately assembled, includes axle housings out of parallelism and one or the other or both housings are non-perpendicular to the fore-and-aft centerline of the vehicle. Substantial misalinement, distortion and other forms of inaccuracies lead to excessive wear on the vehicle tires, bearings and power train. Certain of these inaccuracies lend themselves to correction by cutting the offending ears off the housing and re-welding them. This type of correction is costly, time-consuming and more often than not fails to completely solve the problem.

According to the present invention, the suspension is improved by replacing each connection between walking beam and axle housing with a connection having provision for adjustment of the axle housings relative to each other and to the walking beam by simple adjusting means operative without re-welding or otherwise interchanging parts. The preferred form of the invention utilizes a pair of eccentrically related members which, when moved angularly relative to each other, create fore-and-after movement of that end of the axle housing previously determined to be out of line. Provision is made for effecting the adjustment by a simple tool, such as a wrench or the like. Tie means is provided for securing the adjustment after it is made. Further means is provided for easily releasing the parts for readjustment.

Further details of the invention and features and advantages thereof will become apparent to those skilled in the art as a preferred embodiment of the invention is set forth below.

DETAILED DESCRIPTION OF A PREFERRED EMBODIMENT

Figure 1:
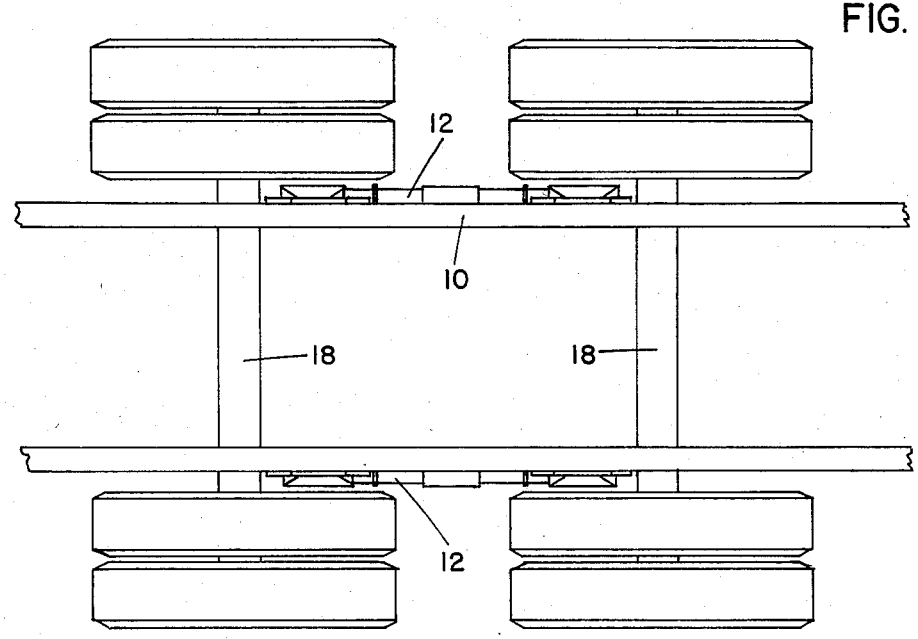
FIG. 1 is a plan, considerably simplified by omission of detail, of a representative type of rear axle suspension in which the invention is embodied.
Figure 2:
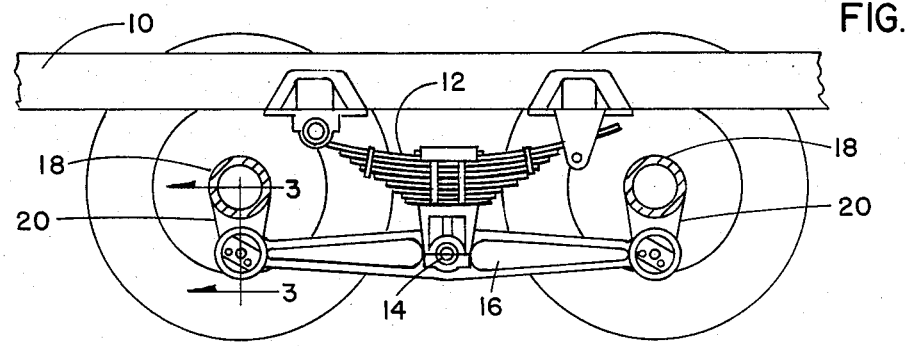
FIG. 2 is a side elevation of the same, the near wheels having been omitted and the axle housing being shown in section.
Figure 3:
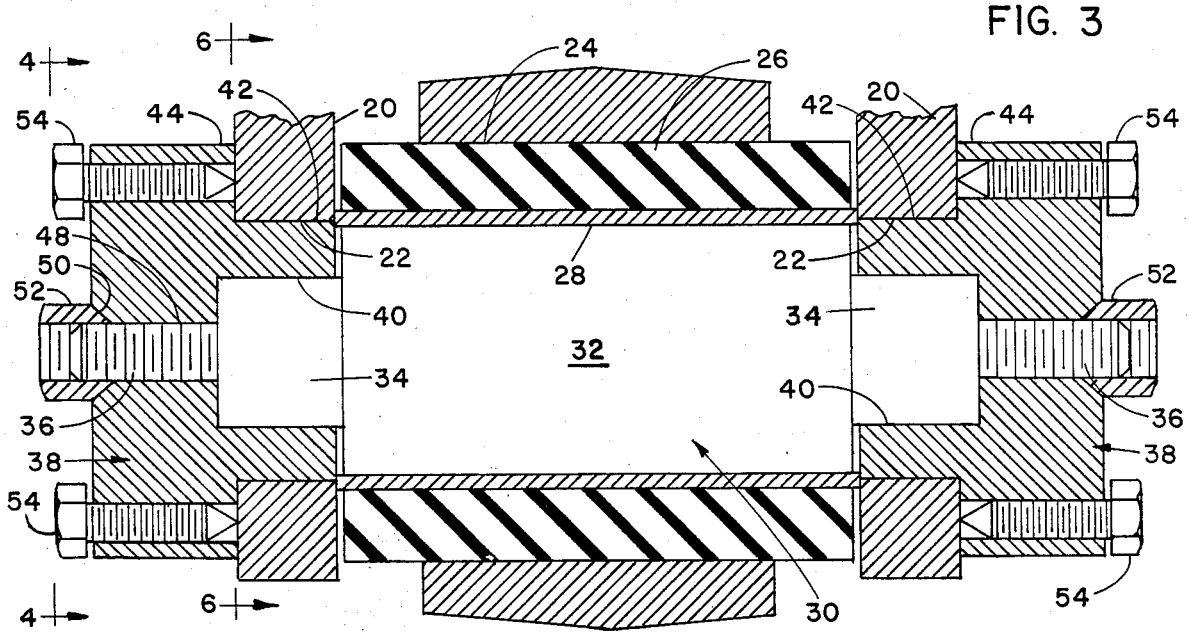
FIG. 3 is a fragmentary section, drawn to an enlarged scale, of the improved connecting structure, the view being taken essentially on the line 3—3 of FIG. 2.
Figure 4:
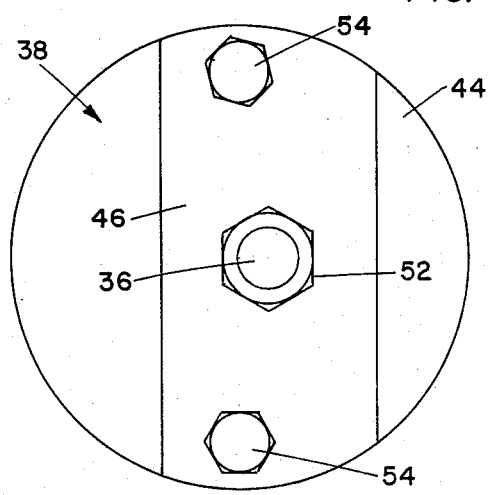
FIG. 4 is a face view of one of the adjustment members as seen generally along the line 4—4 on FIG. 3.
Figure 5:
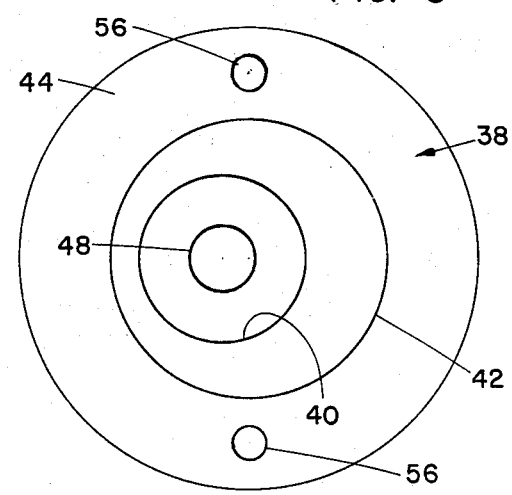
FIG. 5 is a view of an adjustment member as seen from its side opposite that seen in FIG. 4.

Reference will be had first to FIGS. 1 and 2 in terms of background for the invention. Those versed in the art will recognize the rear part of a motor vehicle or like main frame 10 having at each side thereof typical leaf spring means 12, each of which, via a transverse pivot 14, carries an equalizing or walking beam 16. The walking beam extends fore-and-aft symmetrically as respects the pivot 14 and has front and rear ends connected to and supporting front and rear transverse axle housings 18. That one of the housings may house drive axle means is not material here and, thus, those details are omitted. As best seen in FIGS. 2, 3, 6 and 7, each axle housing carries rigidly therewith at each outer end portion a pair of laterally spaced apart ears 20 which straddle the proximate end portion of the associated walking beam. Each ear has therein a circular opening 22, and these are of like diameter and coaxial on a transverse axis theoretically parallel to the axis of its axle housing. In the form of the invention chosen for purposes of the present disclosure, each end of the walking beam is provided with an elongated through bore or opening 24 which is fitted interiorly with a resilient bushing 26 of rubber or like material. Such bushings in general are known in conventional suspensions, especially that known as the Hendrickson Tandem. Similar arrangements involving axle-to-walking beam or equivalent fixed-length supports by means such as bushings of rubber or the like, are found in other tandem-axle suspensions; e.g. the Neway design. In any event, the bushing itself, of course, provides a through bore 28.

As noted earlier herein, it is also conventional to provide the apertured axle housing ears. Thus, the improvement is able to employ conventional background structure, which simplifies its manufacture and use and lowers its cost. The novel interconnecting structure includes means providing a steel cross element 30 which includes, preferably integral with each other, a cylindrical midportion 32 and opposite end cylindrical portions 34 of reduced diameter. The midportion fits the rubber bushing 28 and the end portions project respectively beyond opposite sides or faces of the walking beam and respectively into the openings in the axle housing ears 20. The cylindrical portions are of like diameter which is substantially smaller than that of the ear openings. As a further part of the preferably one-piece element 32, integral coaxial threaded extensions 36 project oppositely outwardly from the cylindrical portions.

Figure 6:
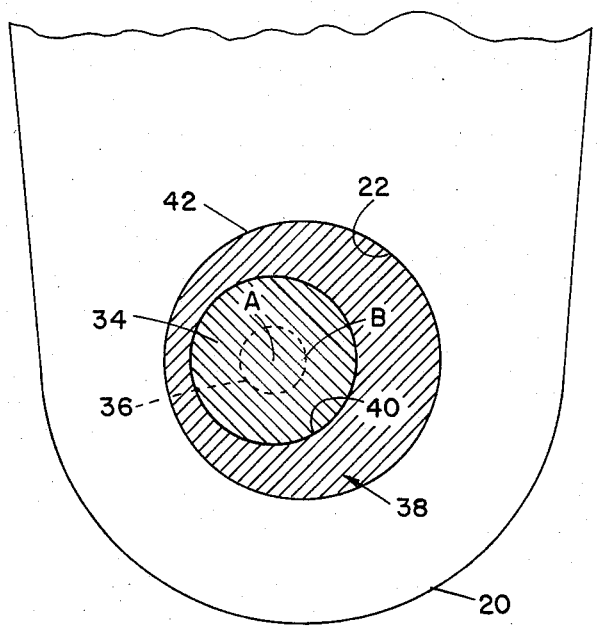
FIG. 6 is a section as seen along the line 6—6 of FIG. 3, showing a stage of maximum adjustment in one direction.
Figure 7:
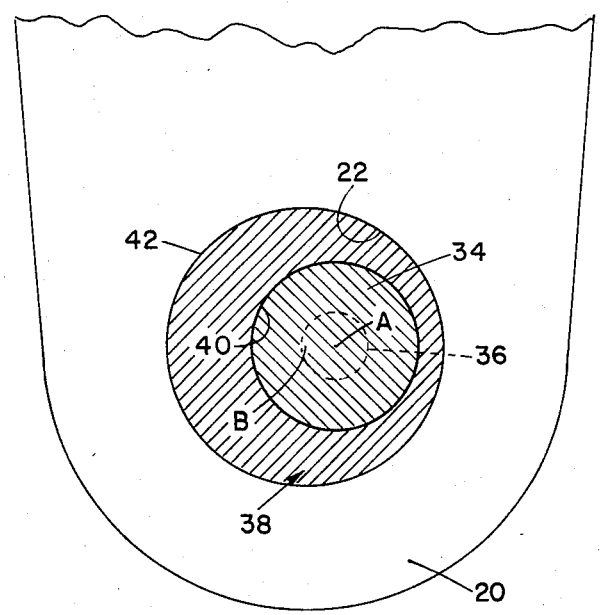
FIG. 7 is a similar view but shows the diametrically opposite stage of adjustment.

The interconnecting structure further includes a pair of adjustment members 38, one at each end of the cross element 30. Each such member is of steel or like material and has at its inner side a cylindrical pocket or bore 40 rotatably receivable by the adjacent cylindrical portion 34 of the element 30. Each adjustment member further has at its inner side a cylindrical periphery or surface 42 which is rotatably receivable by the circular opening in the adjacent housing ear 20. But the axes of the bore 40 and surface 42 are eccentric to each other so that, when the adjustment member is manually turned about the cylindrical element portion 34 as a center, the eccentricity of the axes causes the cylindrical surface to shift the axle housing fore and aft relative to the walking bean within the limits established by the offset or eccentricity of the two axes just referred to. This will be best understood by viewing FIGS. 6 and 7, where the letter A designates the center of the member 30 and the letter B designates the center of the adjustment member 38. In FIG. 6, B is to the right or ahead of A meaning that the axle housing has been shifted forwardly to its maximum forward position. In FIG. 7, the centers are reversed to show the maximum rearward shift of the axle housing, both adjustments of course being relative to the associated walking position, the fore-and-aft position which is of course fixed by the pivot of the walking beam at 14. It will be understood that when the adjustment is made at one end of the axle housing, the housing in effect "pivots" at the rubber bushing at its opposite end. It should also be understood that both adjustment members should be turned simultaneously and for this purpose, each adjustment member has an integral circular flange 44 provided exteriorly with a lug 46 or equivalent tool-receiving part for receiving a tool such as a wrench.

When assembled, the flanges overlie the outer axle housing ears and the inner ends of the adjustment members abut the shoulders on the element 30 at the junctions of the portions 34-32-34 to maintain lateral positioning of the parts. Each adjustment member has a central opening 48 through which the proximate threaded extension 37 of the element 30 projects. The opening 48 terminates exteriorly as a conical cavity 50 and, at each end, a conical or "lug" nut 52 is threaded onto the proximate extension, seating in the cavity and completing the tie means that ties the structure together in the assembled condition shown in FIG. 3. Once the selected adjusted position is achieved, it is secured by locking means, here comprising a pair of set screws 54 threadedly carried by the adjustment member via tapped bores 56 and extending therethrough to engage the associated housing ear. Each set screw may be of the type having a hardened point so as to bite into the ear in order to prevent accidental angular movement of the adjustment member relative to the ear. When it is desired to disassemble the structure for replacement, readjustment, etc., the tie nuts are removed or loosened and the set screws further tightened, which serves to jack the adjustment member out of its dual fit with the housing ear and cylindrical portion 34.

It will be understood that the foregoing has proceeded on the basis of a preferred embodiment of the invention and it follows that many modifications may be made in that structure without departing from the spirit and scope of the invention.

We claim:

1. In a vehicle axle suspension including a fore-and-aft walking beam and a transverse axle housing having a pair of spaced apart ears straddling the walking beam, said ears respectively having circular openings of like diameter therein and coaxial on a transverse axis, the improvement comprising interconnecting structure between the walking beam and axle housing, including means carried by the walking beam and providing a pair of opposite, transversely coaxial cylindrical portions of like diameter projecting respectively at opposite sides of the walking beam and respectively into the axle housing ear openings, said portions being of lesser diameter than said openings, a pair of adjustment members respectively cooperative with the cylindrical portions and openings for mounting the axle housing on the walking beam, each adjustment member having an internal cylindrical bore rotatably receiving the adjacent cylindrical portion and an exterior cylindrical surface rotatably receiving the adjacent ear opening, the axes of the bore and surface being eccentric to each other whereby angular movement of an adjustment member causes the axle housing to shift relative to the walking beam, and means for securing the adjustment in any selected position of adjustment.

2. The improvement according to claim 1, in which each adjustment member includes a transversely external flange portion overlying the adjacent axle housing ear.

3. The improvement according to claim 2, in which each flange portion includes an integral tool-receiving part for receipt of a tool for turning the adjustment member.

4. The improvement according to claim 1, including tie means projecting respectively from the cylindrical portions and through the associated adjustment members as externally threaded extensions, and a pair of internally threaded elements threaded respectively on said extensions for securing the adjustment members axially toward each other.

5. The improvement according to claim 4, including means in addition to the tie means for selective engagement and disengagement between an adjustment member and the associated axle housing ear to prevent and enable rotation of an adjustment member relative to the axle housing ear.

6. The improvement according to claim 5, in which each additional means is screw-threaded through the adjustment member for engagement with the adjacent ear and serves to jack the adjustment member outwardly away from its ear after the tie means is released.

7. The improvement according to claim 1, in which the means carried by the walking beam includes a cylindrical member passing through the walking beam and the cylindrical portions are coaxially integral with said member.

8. The improvement according to claim 7, including integrally coaxial externally threaded extensions projecting respectively from the cylindrical portions, the adjustment members are apertured to receive the extensions, and nuts are received respectively by the extensions to tie the adjustment members, axle housing ears and walking beam together.

* * * * *